(12) United States Patent
Robel et al.

(10) Patent No.: US 8,635,853 B2
(45) Date of Patent: Jan. 28, 2014

(54) EXHAUST REDUCTION SYSTEM HAVING OXYGEN AND TEMPERATURE CONTROL

(75) Inventors: Wade J. Robel, Peoria, IL (US); James J. Driscoll, Dunlap, IL (US); Michael S. Bond, Chillicothe, IL (US); David M. Milam, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1160 days.

(21) Appl. No.: 12/010,488

(22) Filed: Jan. 25, 2008

(65) Prior Publication Data

US 2009/0188235 A1  Jul. 30, 2009

(51) Int. Cl.
  *F01N 3/00* (2006.01)
  *F01N 3/10* (2006.01)
  *F01N 5/04* (2006.01)

(52) U.S. Cl.
  USPC .................. 60/285; 60/274; 60/276; 60/280; 60/301

(58) Field of Classification Search
  USPC .................................. 60/276, 285, 295, 301
  See application file for complete search history.

(56) References Cited

U.S. PATENT DOCUMENTS

| | | | |
|---|---|---|---|
| 5,943,857 A | 8/1999 | Ansell et al. | |
| 6,615,580 B1 | 9/2003 | Khair et al. | |
| 6,701,707 B1 | 3/2004 | Upadhyay et al. | |
| 6,807,807 B2 | 10/2004 | Kagenishi | |
| 6,826,906 B2 | 12/2004 | Kakwani et al. | |
| 6,871,489 B2 | 3/2005 | Tumati et al. | |
| 6,988,361 B2 * | 1/2006 | van Nieuwstadt et al. | 60/295 |
| 7,005,116 B2 * | 2/2006 | Schafer-Sindlinger et al. | 423/239.2 |
| 7,032,572 B2 | 4/2006 | Bidner et al. | |
| 7,065,958 B2 | 6/2006 | Funk et al. | |
| 7,114,324 B2 * | 10/2006 | Hoard et al. | 60/275 |
| 7,114,325 B2 | 10/2006 | Surnilla et al. | |
| 7,134,273 B2 | 11/2006 | Mazur et al. | |
| 7,178,328 B2 | 2/2007 | Solbrig | |
| 7,587,889 B2 * | 9/2009 | Frazier et al. | 60/285 |
| 7,765,800 B2 * | 8/2010 | Tsumagari et al. | 60/301 |
| 2004/0112046 A1 | 6/2004 | Tumati et al. | |
| 2005/0129601 A1 | 6/2005 | Li et al. | |
| 2005/0229872 A1 | 10/2005 | Lange | |
| 2006/0283174 A1 * | 12/2006 | Leone et al. | 60/285 |
| 2007/0243115 A1 | 10/2007 | Tsumagari et al. | |

FOREIGN PATENT DOCUMENTS

JP  2005-023921  *  1/2005

* cited by examiner

*Primary Examiner* — Thomas Denion
*Assistant Examiner* — Diem Tran
(74) *Attorney, Agent, or Firm* — Finnegan, Henderson, Farabow, Garrett & Dunner LLP

(57) ABSTRACT

An exhaust system for use with an engine is disclosed. The exhaust system may have a first treatment device situated to receive a flow of exhaust and convert a first constituent of the exhaust to a second constituent, and a second treatment device located downstream of the first treatment device to reduce the first and second constituents. The exhaust system may also have a sensor configured to generate a signal indicative of one of a temperature and an oxygen concentration of the exhaust, and a controller in communication with the sensor. The controller may be configured to vary the other of the temperature and the oxygen concentration based on the signal such that a desired amount of the first constituent is converted to the second constituent by the first treatment device prior to reduction by the second treatment device.

24 Claims, 3 Drawing Sheets

EXHAUST REDUCTION SYSTEM HAVING OXYGEN AND TEMPERATURE CONTROL

TECHNICAL FIELD

The present disclosure is directed to an exhaust reduction system and, more particularly, to an exhaust reduction system having oxygen and temperature control.

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where gaseous or liquid reductant (most commonly urea) is added to the exhaust gas stream of an engine and is absorbed onto a catalyst. The reductant reacts with NOx in the exhaust gas to form $H_2O$ and $N_2$. Although SCR can be effective, it is most effective when a concentration of NO to $NO_2$ supplied to the SCR is about 1:1. In order to achieve this optimum ratio, a Diesel Oxidation Catalyst (DOC) is often located upstream of the SCR to convert NO to $NO_2$.

In addition to facilitating the reduction process of the SCR, the $NO_2$ produced (i.e., converted from NO) by the DOC can also facilitate the combustion of collected particulate matter. Specifically, a particulate trap is commonly used to collect unburned particulates also known as soot. Over time, the particulate matter builds up in the trap and, if left unchecked, the particulate trap could negatively affect performance of the engine. As such, the particulate matter collected by the trap must be periodically or continuously removed through a process called regeneration. To regenerate the particulate trap, a fuel (typically diesel or partially combusted diesel products from the engine) is combusted upstream of the trap, either in a burner device or over an oxidation catalyst, resulting in an increase in exhaust gas temperature. The organic and elemental carbon components of the diesel particulate matter are then oxidized by oxygen and $NO_2$ present in the exhaust gas at this elevated temperature. An efficiency of the regeneration process, like the SCR process, can be affected by the amount of $NO_2$ present in the exhaust flow.

It is known that the ratio of NO to $NO_2$ contained in the exhaust stream exiting the DOC may vary based at least partially on the flow rate of exhaust passing through the DOC and a temperature of the exhaust within the DOC. The flow rate of exhaust passing through the DOC, in most situations, may be almost completely dependent on operation of the engine (i.e., on a flow rate of gases combusted and subsequently exhausted from the engine). Thus, the conversion rate of NO to $NO_2$ has historically been controlled by varying the temperature of the exhaust.

A system implementing such a strategy is described in U.S. Pat. No. 6,807,807 (the '807 patent) issued to Kagenishi on Oct. 26, 2004. The '807 patent discloses an exhaust gas purifying apparatus having a particulate filter, an oxidation catalyst, a front oxidation catalyst, a bypass path, and a passage switching device disposed in an exhaust path. The front oxidation catalyst is disposed further upstream than the oxidation catalyst. The bypass path bypasses the upstream side and the downstream side of the front oxidation catalyst during normal operation such that the entire gas flow passes only through the oxidation catalyst and the particulate trap. The passage switching device switches the flow of exhaust gas to the front oxidation catalyst from the bypass path during filter regeneration. That is, when the filter is forcibly recovered (i.e., regenerated), the temperature of the exhaust gas is raised by an injection of fuel and is made to pass through the front oxidation catalyst such that the oxidation catalyst is sufficiently warmed and an adequate amount of NO is converted to $NO_2$ for optimum regeneration of the filter. After the oxidation catalyst is properly activated, the flow of exhaust gas is switched back to pass through the bypass path, and regeneration of the filter is completed in the presence of $NO_2$.

Although somewhat effective at controlling the conversion of NO to $NO_2$ during filter regeneration, the exhaust gas purifying apparatus of the '807 patent may be complex, inefficient, and lack applicability. That is, the apparatus of the '807 patent requires multiple oxidation catalysts and complicated bypass and heating structures. These components increase the complexity of the system, as well as part and assembly cost. In addition, the temperature required by the DOC to convert the appropriate amount of NO to $NO_2$ may be at least partially dependent on an amount of oxygen available to the DOC. For example, a relatively low amount of oxygen available to the DOC may require a relatively low temperature for the proper conversion of NO to $NO_2$. In contrast, a relatively high amount of oxygen available to the DOC may require a relatively high temperature for the proper conversion. Because the '807 patent does not account for this relationship, there may be situations where the temperature provided by the gas purifying apparatus is too cold or too hot for optimum conversion (or when the amount of oxygen provided to the DOC is inappropriate for a given temperature of the DOC). Thus, the control strategy described in the '807 patent, which may be successfully applied to particulate trap regeneration, may be suboptimal when implemented in conjunction with an SCR device requiring a precise ratio of NO to $NO_2$.

The system of the present disclosure solves one or more of the problems set forth above.

SUMMARY

One aspect of the present disclosure is directed to an exhaust system. The exhaust system may include a first treatment device situated to receive a flow of exhaust and convert a first constituent of the exhaust to a second constituent, and a second treatment device located downstream of the first treatment device to reduce the first and second constituents. The exhaust system may also include a sensor configured to generate a signal indicative of one of a temperature and an oxygen concentration of the exhaust, and a controller in communication with the sensor. The controller may be configured to vary the other of the temperature and the oxygen concentration based on the signal such that a desired amount of the first constituent is converted to the second constituent by the first treatment device prior to reduction by the second treatment device.

Another aspect of the present disclosure is directed to a method of operating an engine. The method may include combusting fuel to produce a flow of exhaust, and passing the exhaust through a catalyst to convert a first constituent of the exhaust to a second constituent. The method may also include reducing the first constituent and the second constituent. The method may further include determining one of a temperature and an oxygen concentration of the exhaust entering the catalyst, and responsively varying the other of the temperature and the oxygen concentration such that a desired amount of the first constituent is converted to the second constituent.

DETAILED DESCRIPTION

Figure 1:
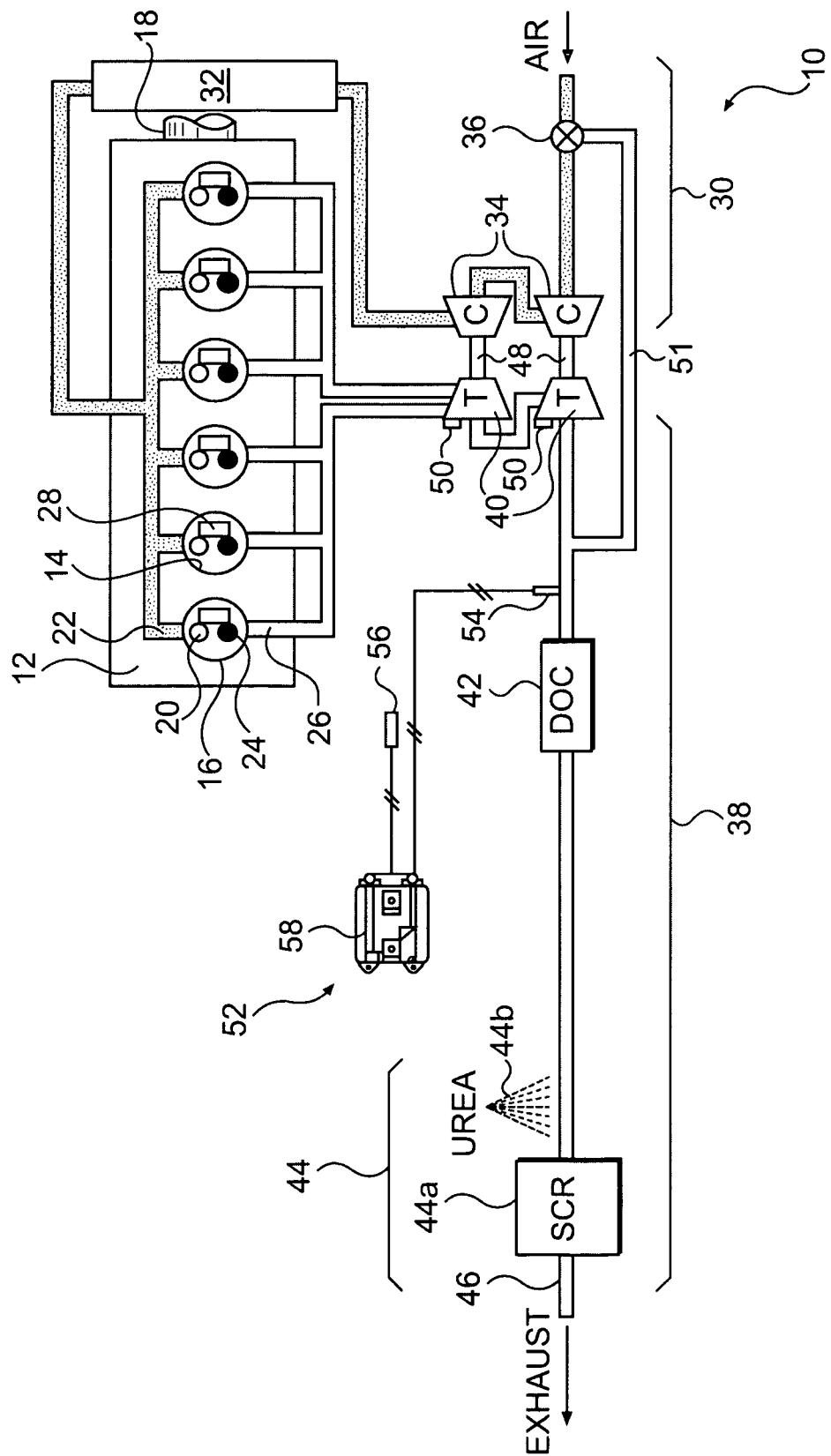
FIG. 1 is a schematic and diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of internal combustion engine, such as, for example, a gasoline or gaseous fuel-powered engine. Power system 10 may include an engine block 12 that at least partially defines a plurality of cylinders 14, and a plurality of piston assemblies 16 disposed within cylinders 14. It is contemplated that power system 10 may include any number of cylinders 14 and that cylinders 14 may be disposed in an "in-line" configuration, a "V" configuration, or any other conventional configuration.

Each piston assembly 16 may be configured to reciprocate between a bottom-dead-center (BDC) position (lower-most position within cylinder 14), and a top-dead-center (TDC) position (upper-most position within cylinder 14). In particular, piston assembly 16 may be pivotally coupled to a crankshaft 18 by way of a connecting rod (not shown). Crankshaft 18 of power system 10 may be rotatably disposed within engine block 12, and each piston assembly 16 coupled to crankshaft 18 such that a sliding motion of each piston assembly 16 within each cylinder 14 results in a rotation of crankshaft 18. Similarly, a rotation of crankshaft 18 may result in a sliding motion of piston assemblies 16. As crankshaft 18 rotates through about 180 degrees, piston assembly 16 may move through one full stroke between BDC and TDC. In one embodiment, power system 10 may be a four stroke (e.g., four cycle) engine, wherein a complete cycle includes an intake stroke (TDC to BDC), a compression stroke (BDC to TDC), a power stroke (TDC to BDC), and an exhaust stroke (BDC to TDC). It is also contemplated that power system 10 may alternatively embody a two stroke (e.g., two cycle) engine, wherein a complete cycle includes a compression/exhaust stroke (BDC to TDC) and a power/exhaust/intake stroke (TDC to BDC).

An intake valve 20 may be associated with each cylinder 14 to selectively restrict fluid flow through a respective intake port 22. Each intake valve 20 may be actuated to move or "lift" to thereby open the respective intake port 22. In a cylinder 14 having a pair of intake ports 22 and a pair of intake valves 20, the pair of intake valves 20 may be actuated by a single valve actuator (not shown) or by a pair of valve actuators (not shown). Of the four piston strokes described above, each intake valve 20 may open during a portion of the intake stroke to allow air or an air and fuel mixture to enter each respective cylinder 14 during normal operation.

An exhaust valve 24 may also be associated with each cylinder 14, and configured to selectively block a respective exhaust port 26. Each exhaust valve 24 may be lifted to thereby open the respective exhaust port 26. In a cylinder 14 having a pair of exhaust ports 26 and a pair of exhaust valves 24, the pair of exhaust valves 24 may be actuated by a single valve actuator (not shown) or by a pair of valve actuators (not shown). Of the four piston strokes described above, each exhaust valve 24 may open during a portion of the exhaust stroke to allow exhaust to be pushed from each respective cylinder 14 by the motion of piston assemblies 16.

Each of intake and exhaust valves 20, 24 may be operated in any conventional way to move from the closed or flow blocking position to the open or flow passing position in a cyclical manner. For example, intake and exhaust valves 20, 24 may be lifted by way of a cam (not shown) that is rotatingly driven by crankshaft 18, by way of a hydraulic actuator (not shown), by way of an electronic actuator (not shown), or in any other manner. During normal operation of power system 10, intake and exhaust valves 20, 24 may be lifted in a predefined cycle related to the motion of piston assemblies 16. It is contemplated, however, that a variable valve actuator 28 may be associated with one or more of intake and/or exhaust valves 20, 24 to selectively interrupt the cyclical motion thereof during alternative modes of operation. In particular, one or more of intake and/or exhaust valves 20, 24 may be selectively opened, held open, closed, or held closed by variable valve actuator 28 to implement a mode of operation that varies an air-to-fuel ratio (A/F) of fluid passing into and/or through power system 10.

For example, variable valve actuator 28 may vary an opening timing of intake valve 20 during an intake stroke and/or a closing timing of exhaust valve 24 during a preceding exhaust stroke to implement an internal exhaust gas recirculation (EGR) mode of operation where exhaust may be redirected back into power system 10 for subsequent combustion. By reintroducing exhaust into the engine, less oxygen ($O_2$) may be brought into the engine during any one cycle, while more $CO_2$ and $H_2O$ may be brought in. Less $O_2$ entering power system 10 may result in less NOx production and less $O_2$ in the exhaust exiting power system 10. More $CO_2$ and $H_2O$ may result in a greater heat capacity of the system and, thus, lower exhaust temperatures. Alternatively, if internal EGR is already being implemented, variable valve actuator 28 may be controlled to reduce the amount of exhaust gas being recirculated. A reduction in exhaust gas recirculation may result in higher concentrations of $O_2$ in the exhaust and higher temperatures.

In another example, variable valve actuator 28 may maintain intake valve 20 open into a portion of the compression stroke to implement a Miller cycle mode of operation where some portion of the $O_2$ within cylinders 14 is pushed in reverse direction through inlet ports 22, rather than being combusted. The reduced amount of $O_2$ being combusted as a result of the Miller cycle may reduce the production of NOx and result in lower $O_2$ concentrations and higher temperatures in the exhaust. Alternatively, if the Miller cycle is already being implemented, variable valve actuator 28 may be controlled to reduce the amount of $O_2$ being pushed from cylinders 14, thereby increasing $O_2$ concentrations and lowering temperatures of the exhaust exiting power system 10. It is contemplated that variable valve actuator 28 may implement additional or alternative modes of operation known in the art to vary the A/F of and/or amount of fluid passing through power system 10, if desired.

An air induction system 30 may be associated with power system 10 and include components that condition and introduce compressed air into cylinders 14 by way of intake ports 22 and intake valves 20. For example, air induction system 30 may include an air cooler 32 located downstream of one or more compressors 34. Compressors 34 may be connected to pressurize inlet air directed through and chilled by cooler 32. A throttle valve 36 may be located upstream of compressors 34 to selectively regulate (i.e., restrict) the flow of inlet air into power system 10. A restriction may reduce the A/F of power system 10 and/or an overall amount of fluid passing through power system, resulting in less $O_2$ entering and exiting power system 10 and a higher exhaust temperature. It is contemplated that air induction system 30 may include different or additional components than described above such as, for example, filtering components, compressor bypass components, thermostat devices associated selective control of air cooler 32, and other known components.

An exhaust system 38 may also be associated with power system 10, and include components that condition and direct exhaust from cylinders 14 to the atmosphere. For example, exhaust system 38 may include one or more turbines 40 driven by the exiting exhaust, a first and a second treatment device 42, 44 disposed in series and fluidly connected downstream of turbine 40, and an exhaust outlet 46 configured to direct treated exhaust from second treatment device 44 to the atmosphere. It is contemplated that exhaust system 38 may include different or additional components than described above such as, for example, bypass components, an exhaust heater, a braking device, an attenuation device, additional treatment devices, and other known components.

Turbine 40 may be located to receive exhaust leaving power system 10 via exhaust ports 26. Turbine 40 may be connected to one or more compressors 34 of air induction system 30 by way of a common shaft 48 to form a turbocharger. As the hot exhaust gases exiting power system 10 move through turbine 40 and expand against vanes (not shown) thereof, turbine 40 may rotate and drive the connected compressor 34 to pressurize inlet air.

Turbine 40 may embody a variable geometry turbine (VGT). VGTs are a variety of turbochargers having geometry adjustable to attain different aspect ratios such that adequate boost pressure may be supplied to cylinders 14 under a range of operational conditions. In one embodiment, turbine 40 may include vanes movable by an actuator 50. As these vanes move, a flow area between the vanes may change, thereby changing the aspect ratio of the turbocharger. In another embodiment, turbine 40 may have nozzle ring adjustable by actuator 50. During operation of the turbocharger, the orientation of the nozzle ring may be adjusted to vary a flow area through a nozzle portion (not shown) of turbine 40.

As the flow area of turbine 40 changes, the performance of the turbocharger may also change. For example, as the flow area decreases, the flow rate of exhaust through turbine 40 may proportionally decrease, while the pressure and/or flow of the inlet air produced by compressor 34 may increase. In contrast, as the flow area of turbine 40 increases, the flow rate of exhaust through turbine 40 may proportionally increase and the pressure and/or flow rate of the inlet air produced by compressor 34 may decrease. An increased pressure and/or flow rate of air entering power system 10 may result in an increased amount of $O_2$ entering and exiting power system and/or a lower combustion temperature within power system 10.

It is contemplated that a wastegate (not shown) or a pressure relief valve may also or alternatively be associated with compressor 34 and/or turbine 40. The wastegate and/or pressure relief valve may also or alternatively be operated by actuator 50, if desired, to affect the A/F of and/or amount of fluid passing through power system 10. Thus, actuator 50, whether associated with the variable flow area of turbine 40, a wastegate, a pressure relief valve, or another device may function to vary the A/F and/or amount of fluid passing through power system 10 and, subsequently, the $O_2$ concentration and temperature of exhaust exiting power system 10.

First treatment device 42 may cooperate with second treatment device 44 to condition the exhaust flow from power system 10. In particular, first treatment device 42 may embody a catalyst configured to convert a first constituent of the exhaust flow to a second constituent, which may be more susceptible to conditioning within second treatment device 44. In one example, first treatment device 42 may be a catalyst such as a diesel oxidation catalyst (DOC). As a DOC, first treatment device 42 may include a porous ceramic honeycomb structure or metal mesh substrate coated with a material, for example a precious metal, that catalyzes a chemical reaction to alter the composition of the exhaust. For example, first treatment device 42 may include platinum or vanadium to facilitate the conversion of NO to $NO_2$.

Figure 2:
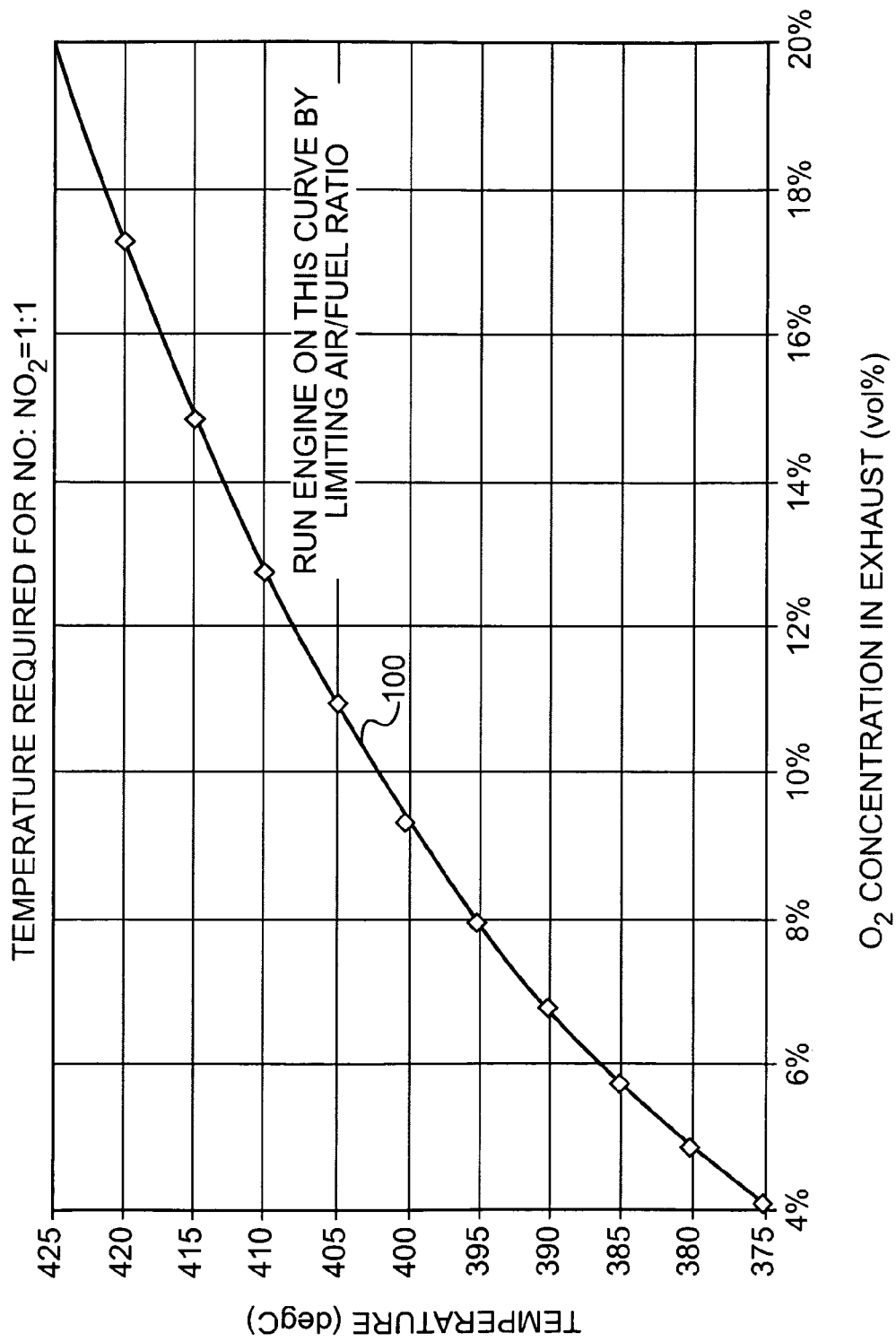
FIG. 2 is an exemplary relationship map that may be utilized by the power system of FIG. 1.

The conversion efficiency and/or rate of first treatment device 42 may be related to an amount of $O_2$ within and a temperature of exhaust entering first treatment device 42. That is, for a given concentration of $O_2$ in the exhaust, a particular temperature may force a desired amount of NO (about 50% of the total NOx in one example) to be converted to $NO_2$ through thermodynamic equilibrium. Similarly, for a given temperature of the exhaust, a particular concentration of $O_2$ may force the desired conversion. This relationship may be illustrated by the map of FIG. 2. Specifically, a non-linear curve 100 in the map of FIG. 2 may represent a desired concentration of NO to $NO_2$ (about 1:1 in one example) exiting first treatment device 42, and the corresponding exhaust temperature and $O_2$ concentration levels required to force the desired conversion. As can be seen from curve 100, when the $O_2$ concentration is kept within a range of about 4-20% and the temperature is correspondingly kept within a range of about 375-425° C. (i.e., power system 10 is operated along curve 100), the desired concentration of NO to $NO_2$ may be maintained.

Second treatment device 44 may receive exhaust from first treatment device 42 to reduce constituents of the exhaust to innocuous gases. In particular, second treatment device 44 may embody a Selective Catalytic Reduction (SCR) device. As an SCR device, second treatment device 44 may include a catalyst substrate 44a located downstream from a reductant injector 44b. A gaseous or liquid reductant, most commonly urea ($NH_3$), may be sprayed or otherwise advanced into the exhaust upstream of catalyst substrate 44a. As the reductant is absorbed onto the surface of catalyst substrate 44a, the reductant may react with NOx (NO and $NO_2$) in the exhaust gas to form water ($H_2O$) and elemental nitrogen ($N_2$). The reduction process performed by second treatment device 44 may be most effective when a concentration of NO to $NO_2$ supplied to second treatment device 44 is about 1:1.

It is contemplated that an external EGR circuit 51 may also be associated with power system 10 to redirect a portion of the exhaust from exhaust system 38 to air induction system 30, if desired. EGR circuit 51 may be connected to exhaust system 38 at a location downstream of turbine 40, and connected to air induction system 30 at a location upstream of compressor 34. In one embodiment, throttle valve 36 may perform dual functions, regulating the flow of inlet air and the flow of exhaust into power system 10. In another example, a dedicated exhaust valve (not shown) may be located within EGR circuit 51 to control the flow rate of exhaust passing to air induction system 30. In addition to reducing the formulation of NOx by reducing a concentration of $O_2$ entering power system 10, the recirculation of exhaust gases may also reduce a temperature of and $O_2$ concentration within the exhaust exiting power system 10 and passing through first and second treatment devices 42, 44.

A control system 52 may be associated with power system 10 and include component configured to regulate the $O_2$ concentration and/or the temperature of exhaust within first treatment device 42 in order to enhance the operation of second treatment device 44. Specifically, control system 52 may include a sensor 54 configured to determine one of the $O_2$ concentration in and the temperature of the exhaust flow from power system 10, a fluid regulator 56 configured to affect the other of the $O_2$ concentration and the temperature of the exhaust, and a controller 58 in communication with sensor 54 and fluid regulator 56. Controller 58 may be configured to control operation of fluid regulator 56 in response to input received from sensor 54. For example, based on a sensed $O_2$ concentration, the exhaust temperature may be adjusted such that the desired amount of NO is forced to convert to $NO_2$. Alternatively, based on a sensed exhaust temperature, the $O_2$ concentration may be adjusted to force the desired conversion. It is contemplated that both the $O_2$ concentration and the temperature may be simultaneously sensed and/or adjusted to achieve the desired ratio of NO to $NO_2$, if desired.

Sensor 54 may embody a constituent sensor configured to generate a signal indicative of the presence of $O_2$ (i.e., quantity, relative percent, ratio, etc.). If embodied as a physical sensor, sensor 54 may be located upstream of or within first treatment device 42. Sensor 54 may generate a signal indicative of this measurement and send the signal to controller 58.

Alternatively or additionally, sensor 54 may embody a temperature sensor situated to generate a signal indicative of the temperature of the exhaust entering or within first treatment device 42. Sensor 54 may generate a signal indicative of the temperature measurement and send the signal to controller 58.

It is contemplated that sensor 54 may embody a virtual sensor rather than a physical sensor, if desired. A virtual sensor may be a model-driven estimate based on one or more known or sensed operational parameters of power system 10 and/or first treatment device 42. For example, based on a known operating speed, load, inlet temperature, boost pressure, and/or other parameter of power system 10, a model may be referenced to determine the $O_2$ concentration or temperature of the exhaust entering first treatment device 42. As a result, the signal directed from sensor 54 to controller 58 may be based on calculated or estimated values rather than direct measurements, if desired It is further contemplated that additional parameters affecting the conversion of NO to $NO_2$ may also be monitored, if desired. For example, CO and OH produced by power system 10 can negatively affect operation of first treatment device 42. Specifically, the catalyst of first treatment device 42, in addition to reacting with NO, may also react with CO and OH. And, when first treatment device 42 is preoccupied with CO and OH, its ability to convert NO to $NO_2$ may diminish. Thus, it may be important to monitor the production of CO and OH (and/or other constituents affecting the performance of first treatment device 42), and adjust operation of first treatment device 42 accordingly. For this purpose, sensor 54 or another sensor(s) (not shown) may be used to generate signals indicative of concentration levels of CO, OH, and/or other exhaust constituents being produced by power system 10, and direct these signals to controller 58.

Fluid regulator 56 may be associated with one or more components of power system 10, air induction system 30, exhaust system 38, and/or EGR circuit 51 to control the A/F and/or amount of fluid entering power system 10 and, subsequently the $O_2$ concentration and/or temperature of the exhaust exiting power system 10. By changing the A/F of power system 10, the amount of $O_2$ exiting power system may be adjusted. By changing the amount of fluid passing through power system 10, the temperature of the exhaust may be adjusted. For example, flow regulator 56 may be associated with throttle valve 36 to regulate the flow of air and/or exhaust entering power system 10, with variable valve actuator 28 to regulate modes of operation affecting the amount of air combusted within power system 10 and/or the temperature of the combustion process, and/or with actuator 50 to regulate operation of the turbocharger. In response to a signal from controller 58, fluid regulator 56 may selectively increase or decrease the $O_2$ concentration and/or the temperature of exhaust passing through first treatment device 42. It is contemplated that fluid regulator 56 may be integral with throttle valve 36, variable valve actuator 28, and/or actuator 50, if desired.

Controller 58 may embody a single microprocessor or multiple microprocessors that include a means for controlling an operation of flow regulator 56 in response to signals received from sensor 54. Numerous commercially available microprocessors can be configured to perform the functions of controller 58. It should be appreciated that controller 58 could readily embody a general power system microprocessor capable of controlling numerous power system functions and modes of operation. Various other known circuits may be associated with controller 58, including power supply circuitry, signal-conditioning circuitry, solenoid driver circuitry, communication circuitry, and other appropriate circuitry.

Controller 58 may operate the fluid regulator 56 such that a desired amount of a first constituent and a second constituent are received by second treatment device 44. Specifically, in order to enhance the reducing effectiveness of second treatment device 44, controller 58 may operate fluid regulator 56 to provide a ratio of $NO:NO_2$ exiting first treatment device 42 as close to 1:1 as possible, without negatively affecting operation of power system 10. For example, based on the signal received from sensor 54 and the relationship map of FIG. 2, controller 58 may selectively increase or decrease the $O_2$ concentration and/or the temperature of exhaust within first treatment device 42 to increase or decrease the conversion of NO to $NO_2$.

Controller 58 may vary the $O_2$ concentration and/or the temperature of exhaust within first treatment device 42 in an open- or a closed-loop manner. Specifically, based on the signal from sensor 54 and known operating parameters of power system 10 and/or first treatment device 42, controller 58 may reference a relationship map stored in memory thereof and determine a desired $O_2$ concentration and/or temperature of exhaust through first treatment device that results in the ratio of $NO:NO_2$ exiting first treatment device 42 nearing 1:1. From the same or an additional map, controller 58 may determine a change(s) to throttle valve 36, variable valve actuator 28, and/or actuator 50 that results in the desired $O_2$ concentration and/or temperature, and then operate flow regulator 56 to affect the change(s). Alternatively, controller 58 may incrementally affect changes to throttle valve 36, variable valve actuator 28, and/or actuator 50 until the signal from sensor 54 indicates the actual $O_2$ concentration and/or temperature aligning along curve 100 (referring to FIG. 1) and the desired conversion of NO to $NO_2$ is achieved.

Figure 3:
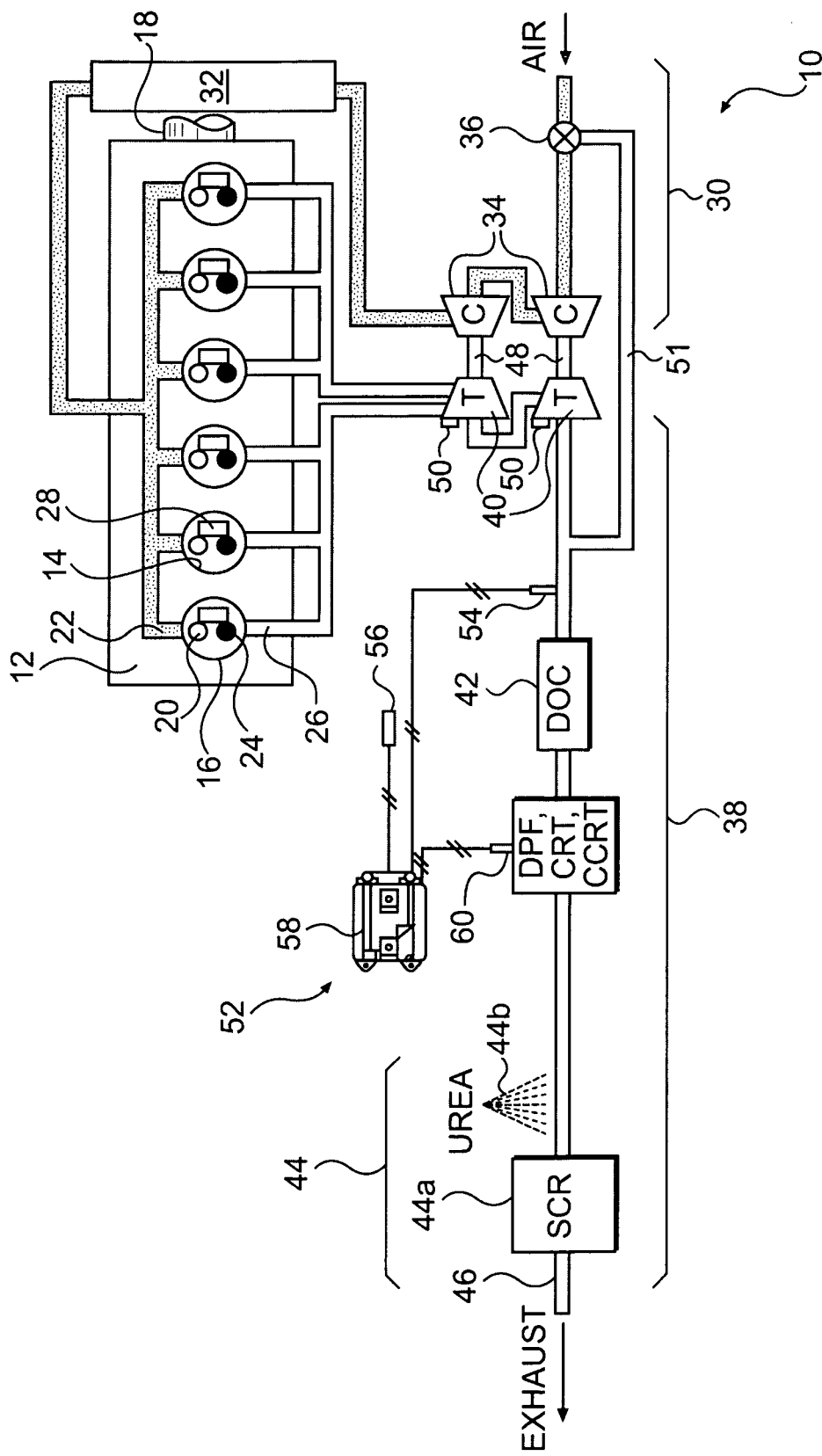
FIG. 3 is another schematic and diagrammatic illustration of another exemplary power system.

FIG. 3 illustrates an alternative embodiment of power system 10. Similar to the embodiment of FIG. 1, power system 10 of FIG. 3 may embody an engine having air induction system 30 and exhaust system 38. However, in contrast to the embodiment of FIG. 1, the exhaust system 38 of FIG. 3 may include additional components. For example, exhaust system 38 may include a soot filter such as a diesel particulate filter (DPF), a continuously regenerating trap (CRT), a catalyzed continuously regenerating trap (CCRT), or other similar device situated to remove soot from the exhaust flow exiting power system 10. Soot filter 60 may be located upstream or downstream of first treatment device 42.

The operation of soot filter 60 may affect operation of first treatment device 42 and/or second treatment device 44. That is, if soot filter 60 is overloaded with particulate matter, the amount of $NO_2$ being received by second treatment device 44 could be negatively affected, even though first treatment device 42 may be converting NO to $NO_2$ properly. To accommodate this situation, the loading of soot filter 60 may need to be monitored and the operation of first treatment device 42 adjusted accordingly. For this purpose, an additional sensor 62 may be associated with soot filter 60.

Sensor 62 may embody any type of sensor utilized to determine an amount of particulate buildup within soot filter 60. For example, sensor 62 may embody a pressure sensor or pair of pressure sensors, a temperature sensor, a model driven virtual sensor, an RF sensor, or any other type of sensor known in the art. Sensor 62 may generate a signal directed to controller 58 indicative of the particulate buildup, and controller 58 may adjust operation of first treatment device 42 accordingly (i.e., to convert a greater or lesser amount of NO to $NO_2$).

INDUSTRIAL APPLICABILITY

The exhaust system of the present disclosure may be applicable to any power system having a treatment device, where performance of the device is enhanced when a particular ratio of exhaust constituents is received by the device. Although applicable to a range of treatment devices, the disclosed exhaust system may be primarily beneficial when associated with a selective catalytic reduction (SCR) device benefiting from a 1:1 ratio of NO to NO2. The disclosed system provides the reduction enhancing $NO:NO_2$ ratio by selectively regulating an $O_2$ concentration and/or temperature of exhaust entering an upstream located diesel oxidation catalyst (DOC). The operation of power system 10 will now be explained.

Referring to FIG. 1, air and fuel may be pressurized and forced into the combustion chambers of power system 10 for subsequent combustion. Fuel may be injected into the combustion chambers of power system 10, mixed with the pressurized air therein, and combusted by power system 10 to produce a mechanical work output and an exhaust flow of hot gases. The exhaust flow may contain a complex mixture of air pollutants composed of gaseous material, which can include oxides of nitrogen (NOx). As this NOx laden exhaust flow is directed from the combustion chambers through first treatment device 42, NO may be converted to $NO_2$.

To enhance operation of second treatment device 44, controller 58 may regulate the $O_2$ concentration and/or the temperature of exhaust passing through first treatment device 42. Specifically, in response to a signal received from sensor 54 indicative of an $O_2$ concentration or a temperature of the exhaust flow (upstream or within first treatment device 42), controller 58 may operate flow regulator 56 to increase or decrease the A/F and/or amount of fluids passing through power system 10. An increase in the A/F may result in more $O_2$ passing into first treatment device 42, while an increase in the amount of fluids may result in a reduction in exhaust temperatures. In contrast, a decrease in the A/F may result in less $O_2$, while a decrease in the amount of fluids may result in higher exhaust temperatures. When the $O_2$ concentration and the temperature of the exhaust entering first treatment device 42 approximately align along curve 100 of relationship map of FIG. 2, the desired amount of NO may be converted to $NO_2$ through thermodynamic equilibrium.

Controller 58 may also adjust operation of first treatment device 42 in response to a concentration of CO and/or OH within the exhaust flow exiting power system 10 and/or a particulate buildup within soot filter 60. Specifically, based on signals from sensor 62 and/or additional sensors, controller 58 may adjust the temperature and/or the amount of $O_2$ entering first treatment device 42 to increase or decrease the conversion effectiveness thereof accordingly.

Several advantages may be associated with the currently disclosed exhaust system. In particular, because the disclosed exhaust system may utilize only a single oxidation catalyst, it may be simple, reliable, and relatively inexpensive. Further, because the disclosed exhaust system may utilize existing components for regulation of the exhaust $O_2$ concentration and/or temperature without significantly impacting fuel consumption of the associated power system, efficiency of the power system may be maintained. In addition, although described as being useful in conjunction with an SCR device, the disclosed exhaust system may be used with many different treatment devices.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. For example, although some devices having an affect on exhaust $O_2$ concentration and temperature have been illustrated and described herein, additional devices and systems may also or alternatively be utilized including, but not limited to, an auxiliary air supply configured to direct a gas (e.g., air) into the exhaust stream for the purpose of increasing the $O_2$ concentration or affecting the temperature of the exhaust, an exhaust brake utilized to increase a backpressure of power system 10 and thereby affect $O_2$ concentration levels and/or exhaust temperature, a direct heating or cooling device situated within air induction system 30 and/or exhaust system 38, and other devices known in the art. It is intended that the specification and examples be considered as exemplary only, with a true scope of the disclosure being indicated by the following claims and their equivalents.

What is claimed is:

1. An exhaust system, comprising:
   a first treatment device situated to receive a flow of exhaust and convert a first constituent of the exhaust to a second constituent;
   a second treatment device located downstream of the first treatment device to reduce the first and second constituents;
   the first and second treatment devices being configured such that each receives the same volume of exhaust throughout operation of the exhaust system;
   a sensor configured to generate a signal indicative of one of a temperature and an oxygen concentration of the exhaust; and
   a controller in communication with the sensor and being configured to vary the other of the temperature and the oxygen concentration of the exhaust entering the first treatment device uncatalyzed based on the signal such that a desired amount of the first constituent is converted to the second constituent by the first treatment device prior to reduction by the second treatment device.

2. The exhaust system of claim 1, wherein the sensor is an oxygen sensor located upstream of the first treatment device.

3. The exhaust system of claim 1, wherein the sensor is a temperature sensor situated to detect a temperature of the exhaust within the first treatment device.

4. The exhaust system of claim 1, wherein the sensor is a virtual sensor configured to determine the one of a temperature and an oxygen concentration of the exhaust based on known operating conditions of an engine that produces the exhaust.

5. The exhaust system of claim 1, further including a fluid regulator, wherein the controller communicates with the fluid regulator to vary the other of the temperature and the oxygen concentration based on the signal.

6. The exhaust system of claim 1, wherein the first treatment device is a diesel oxidation catalyst and the second treatment device is an SCR device.

7. The exhaust system of claim 1, wherein:
the sensor is a first sensor;
the signal is a first signal;
the exhaust system further includes a second sensor configured to generate a second signal indicative of at least one of an OH concentration in the flow of exhaust, a CO concentration in the flow of exhaust, and a particulate buildup; and
the controller is configured to adjust operation of the first treatment device based on the second signal.

8. The exhaust system of claim 1, wherein the other of the temperature and the oxygen concentration is varied by a variable valve actuator operably connected to at least one of an intake valve and an exhaust valve of an engine.

9. The exhaust system of claim 1, wherein the other of the temperature and the oxygen concentration is varied by an actuator operably connected to a turbocharger receiving the uncatalyzed exhaust.

10. The exhaust system of claim 1, wherein the first and second constituents are oxides of nitrogen.

11. The exhaust system of claim 10, wherein the desired amount is a ratio of NO to $NO_2$.

12. The exhaust system of claim 11, wherein the ratio is about 1:1.

13. The exhaust system of claim 1, wherein the controller includes a map stored in memory relating an oxygen concentration and a temperature of the exhaust to the desired amount.

14. The exhaust system of claim 13, wherein the controller varies the other of the temperature and the oxygen concentration based on the map such that an oxygen concentration of between about 4-20% $O_2$ and a temperature of about 375-425° C. is maintained in the exhaust entering the first treatment device.

15. The exhaust system of claim 14, wherein the relationship between the oxygen concentration and the temperature of the exhaust required to convert the desired amount of the first constituent to the second constituent is non-linear.

16. The exhaust system of claim 1, wherein the other of the temperature and the oxygen concentration is varied by a throttle valve, and the signal is indicative of the uncatalyzed exhaust entering the first treatment device.

17. The exhaust system of claim 16, wherein the sensor is disposed upstream of the first treatment device.

18. A method of operating an engine, comprising:
combusting fuel to produce a flow of exhaust;
passing a volume of the exhaust through a catalyst to convert a first constituent of the exhaust to a second constituent;
reducing the same volume of exhaust as is passed through the catalyst by reducing the first constituent and the second constituent in an exhaust treatment device located downstream of the catalyst;
determining one of a temperature and an oxygen concentration of the exhaust entering the catalyst; and
responsively varying the other of the temperature and the oxygen concentration of the exhaust prior to conversion of the first constituent such that a desired amount of the first constituent is converted to the second constituent.

19. The method of claim 18, wherein varying the other of the temperature and the oxygen concentration includes adjusting at least one of an air to fuel ratio and an amount of fluids entering the engine.

20. The method of claim 18, wherein the other of the temperature and the oxygen concentration is varied such that an oxygen concentration of between about 4-20% O2 and a temperature of about 375-425° C. is maintained within the catalyst.

21. The method of claim 18, wherein the first and second constituents are oxides of nitrogen.

22. The method of claim 21, wherein the desired amount is a ratio of NO to NO2.

23. The method of claim 9, wherein the ratio is about 1:1.

24. A power system, comprising:
an engine configured to combust fuel and produce a flow of exhaust;
a passageway configured to direct exhaust away from the engine to the atmosphere;
an oxidation catalyst disposed within the passageway and configured to convert NO to $NO_2$;
an SCR device located within the passageway downstream of the oxidation catalyst and configured to reduce NO and $NO_2$ to elemental components;
the oxidation catalyst and the SCR device being configured such that each receives the same volume of exhaust throughout operation of the power system;
a sensor configured to generate a signal indicative of one of a temperature and an oxygen concentration of the exhaust within the oxidation catalyst;
a fluid regulator configured to affect the other of the temperature and the oxygen concentration; and
a controller in communication with the sensor and the fluid regulator, the controller being configured to adjust operation of the fluid regulator to vary the other of the temperature and the oxygen concentration of the exhaust uncatalyzed based on the signal such that a ratio of NO to $NO_2$ of about 1:1 is received by the SCR device.

\* \* \* \* \*